United States Patent [19]

Torii et al.

[11] Patent Number: 4,973,895
[45] Date of Patent: Nov. 27, 1990

[54] MOTOR DRIVE METHOD FOR AN INDUSTRIAL ROBOT

[75] Inventors: Nobutoshi Torii, Hachioji; Tyo Nihei, Yamanashi; Jun Kikuchi, Hachioji, all of Japan

[73] Assignee: Fanuc Ltd, Minamitsuru, Japan

[21] Appl. No.: 360,940

[22] PCT Filed: Oct. 29, 1988

[86] PCT No.: PCT/JP88/01107
§ 371 Date: May 4, 1989
§ 102(e) Date: May 4, 1989

[87] PCT Pub. No.: WO89/04514
PCT Pub. Date: May 18, 1989

[30] Foreign Application Priority Data

Oct. 30, 1987 [JP] Japan ................. 62-273459

[51] Int. Cl.$^5$ ............................ G05B 11/32
[52] U.S. Cl. ..................... 318/567; 318/563; 318/630; 318/432; 318/625; 364/513; 901/9
[58] Field of Search .............. 318/560–577, 318/603, 632, 430–434, 636, 696, 628, 625, 630; 364/513; 901/9, 12, 15, 20–24

[56] References Cited

U.S. PATENT DOCUMENTS

| 4,182,979 | 1/1980 | Douglas et al. | 318/434 |
| 4,547,858 | 10/1985 | Horak | 364/513 |
| 4,587,469 | 5/1986 | Ikebe et al. | 318/432 |
| 4,712,052 | 12/1987 | Omae et al. | 318/625 |
| 4,772,830 | 9/1988 | Kobari et al. | 318/563 |
| 4,785,221 | 11/1988 | Neko | 318/567 X |
| 4,807,153 | 2/1989 | Onaga et al. | 901/9 X |

FOREIGN PATENT DOCUMENTS 0308613 12/1988 Japan .................. 318/630

Primary Examiner—William M. Shoop, Jr.
Assistant Examiner—Paul Ip
Attorney, Agent, or Firm—Staas & Halsey

[57] ABSTRACT

A motor drive method is provided which is capable of preventing suspension of operation of an industrial robot, and preventing deviation of the track of movement from a command track, attributable to an overload state of a motor. Output torque command values for motors for various axes of the robot are detected (S1). When any one of the detected values exceeds a predetermined value, which is determined in accordance with the maximum output torque of each corresponding one of the motors for the various axes, an amount of move command per unit time, for every one of the axes, is reduced. The amount of move command per unit time is reduced by using the torque command values thus increased, the product of an override value and a coefficient obtained in accordance with the differential of the torque command values (S3, S6 and S14), whereby the overload state of the motor is prevented.

10 Claims, 4 Drawing Sheets

FIG.5
|  Tn \ Ṫn  | TAn < Tn < TBn | TBn < Tn |
|---|---|---|
| 0 < Ṫn < k·Tnmax | dn (= 0.8) | dn (= 0.5) |
| Ṫn > k·Tnmax | dn (= 0.5) | dn (= 0.3) |
Dn
FIG.6
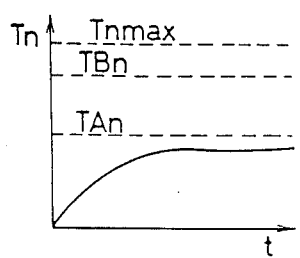
FIG.7
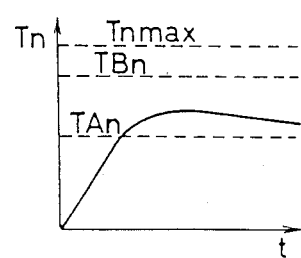
FIG.8
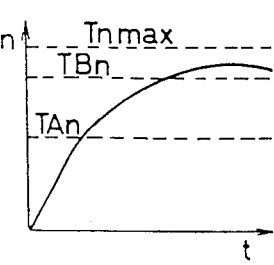

MOTOR DRIVE METHOD FOR AN INDUSTRIAL ROBOT

BACKGROUND OF THE INVENTION

The present invention relates to a motor drive method for an industrial robot which is capable of preventing suspension of operation of the industrial robot, and deviation of the track of movement from a command track, attributable to an overload state of a motor.

An industrial robot generally comprises a plurality of operating sections (e.g., joints of an arm section) severally driven with respect to one or more axes (e.g., around an axis of rotation and along an axis of movement), and a plurality of motors as actuators for severally driving corresponding ones of the operating sections with respect to corresponding axes. The individual motors are driven so that an end position or a final-stage operating section (e.g., wrist section), as an object of speed control, moves at a command speed along a command track. Typically, in a servo system provided for a respective axis of each operating section, pulses (corresponding to a move command value P per unit time for the axis concerned) determined in accordance with a command position and the command speed for the finalstage operating section, are distributed, while a speed feedback signal VF (indicative of the rotational speed of a motor M) is integrated at numeral 103 to obtain a position signal feedback signal Pf, as shown in FIG. 1. Then, a speed command V, which is equivalent to the product of a position loop gain Gp designated by numeral 100 and a deviation Er between the two signals P and Pf, is compared to the speed feedback signal Vf. Subsequently, a torque command value T, which is equivalent to the product of a speed loop gain Gv designated by numeral 101 and the deviation between the two signals V and Vf, is supplied to a servo amplifier 102. A driving current corresponding to the torque command value T is supplied from the servo amplifier 102 to the servomotor M, whereupon the motor produces a required torque. Similar servo systems provided for the individual axes severally operate in the aforementioned manner, thereby working the robot.

If the rotational frequency of the motor M decreases with the increase of load on the motor M, during the operation of the robot, the deviation Er, speed command value V, and torque command value T increase, thereby augmenting the output torque of the motor M to increase the motor speed. Meanwhile, a torque limiter 104 is provided for preventing an overcurrent from flowing through the motor M, and a maximum allowable torque value is previously set in the torque limiter. If the increased torque command value T exceeds the maximum allowable torque value, the motor driving current supplied from the servo amplifier 102 is limited to a value corresponding to the maximum allowable torque value. Consequently, the motor torque output cannot increase to the value corresponding to the increase of the load, so that the deviation Er increases. When the deviation Er attains a predetermined value, the operation of the robot is stopped. If the deviation Er does not attain the predetermined value, the actual rotational speed Vf of the motor does not follow up the speed command value V, although the operation of the robot continues without being stopped. Accordingly, the operating speed of that operating section of the robot which is associated with the axis subject to the deviation increase ceases to follow up the command value. On the other hand, the follow-up performance will not be deteriorated with respect to at least most of the other axes of the operating section concerned and the axes of the other operating sections. Thus, there may be an operative misalignment between the axes of one operating section or between the operating sections, so that the move track of movement of the final-stage operating section, as the object of end position and speed control, will deviate from the command track.

SUMMARY OF THE INVENTION

The object of the present invention is to provide a motor drive method for an industrial robot, which is capable of preventing suspension of operation of the industrial robot, and deviation of the track of movement from a command track, attributable to an overload state of a motor.

In order to achieve the above object, a motor drive method according to the present invention, which is applied to an industrial robot which comprises at least one operating section, a plurality of motors for driving the at least one operating section with respect to a plurality of axes, and control means for delivering a move command to a corresponding one of the motors, comprises the steps of detecting output torques of a plurality of predetermined motors out of the plurality of motors, comparing each of the output torques thus detected to a predetermined value determined beforehand in accordance with the maximum output torque of each corresponding one of the plurality of predetermined motors, and individually decreasing an amount of the move command per unit time, for every one of the plurality of predetermined motors, when any one of the detected output torques exceeds the predetermined value corresponding thereto.

According to the motor drive method of the present invention, since the amount of the move command per unit time, for every one of the plurality of predetermined motors of the industrial robot, is individually decreased when the output torque of any of the predetermined motors exceeds the predetermined value determined beforehand in accordance with the maximum output torque of the motor concerned, there is no possibility of the operation of the robot being stopped or the track of movement of the robot deviating from the command track, even though the load on any of the motors is increased.

BRIEF DESCRIPTION OF THE DRAWINGS

FIG. 5 is a diagram of a coefficient table for setting a coefficient by which an override value is to be multiplied;

FIG. 6 is a graph of the time-based change of a torque command value from the numerical control unit;

FIG. 7 is a graph similar to FIG. 6; and

FIG. 8 is a graph similar to FIG. 6.

DESCRIPTION OF THE PREFERRED EMBODIMENT

Figure 2:
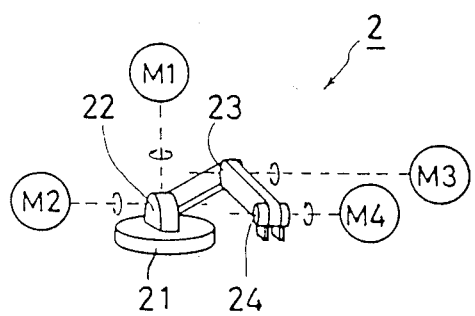
FIG. 2 is a schematic diagram of a robot body to which is applied a motor drive method according to one embodiment of the present invention.

A motor drive method according to one embodiment of the present invention is applied to, for example, an articulated robot shown in FIG. 2. As shown in FIG. 2, a body 2 of the robot includes a swivel slide 21, a first arm section coupled to the swivel slide by means of a revolute joint 22, a second arm section coupled to the first arm section by means of a revolute joint 23, a wrist section coupled to the second arm section by means of a revolute joint 24, servomotors M1 to M4 as actuators for driving the elements 21 to 24 with respect to their respective swivel axes or rotation axes, pulse coders (not shown) attached individually to these motors, etc.

Figure 3:
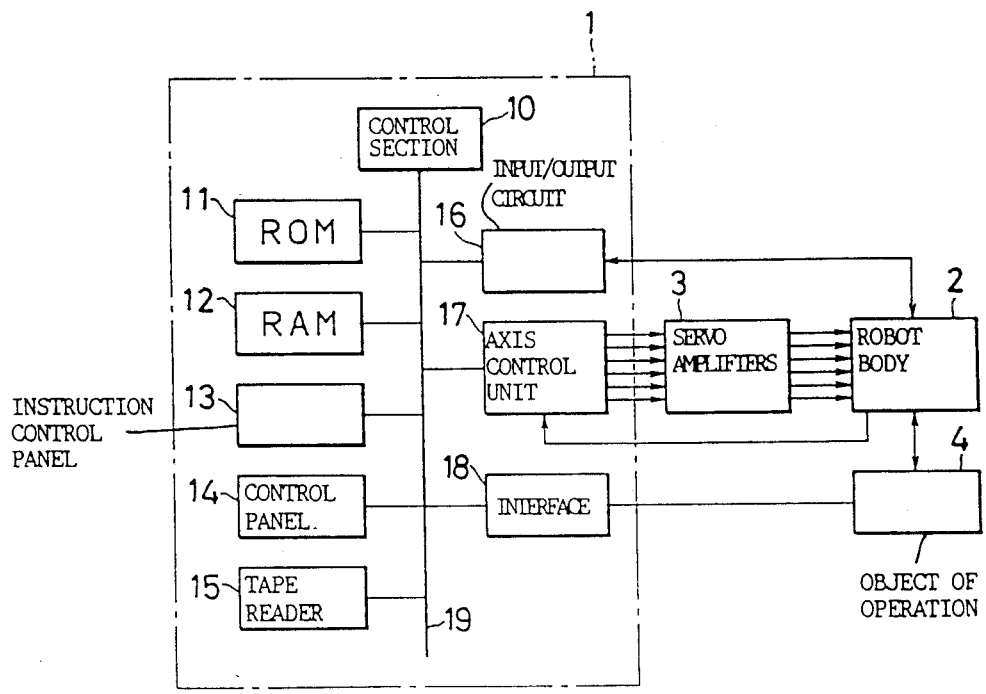
FIG. 3 is a block diagram of the robot body and a numerical control unit for controlling the same.

Referring to FIG. 3, a numerical control unit 1 (hereinafter referred to as a NC unit) as a control unit for controlling the robot body 2 includes a control section 10 having a central processing unit (hereinafter referred to as CPU), and the control section 10 is connected individually by means of a bus 19 with a ROM 11, a nonvolatile RAM 12, an instruction control panel 13, a control panel 14 having a CRT display unit, a tape reader 15, an input/output circuit 16, an axis control unit 17, and an interface 18.

Figure 1:
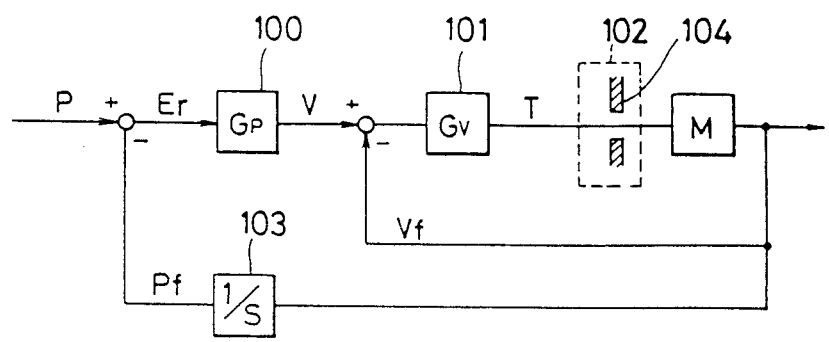
FIG. 1 is a block diagram of a servo system associated with one axis of a robot.

The ROM 11 is stored with various programs to be executed by the CPU of the control section 10. The RAM 12 is adapted to be stored with instruction data entered individually through the instruction control panel 13, the control panel 14, and the tape reader 15, various set data entered through the control panel 14, and the results of and data on calculations executed by the control section 10. The instruction control panel 13 has a numerical display unit, lamps, and control buttons that are necessary for the operation of the robot. The control panel 14 has various keys, including ten-keys and functions keys used to enter data, such as various set values, besides the CRT display unit. The axis control unit 17 is connected to servo amplifiers 3 for driving the servomotors M1 to M4 for the various axes of the robot. In this embodiment, a digital servo system is adopted such that a current command value, i.e., a torque command value, is supplied to the servo amplifiers 3. More specifically, the axis control unit 17 is arranged to output a command value corresponding to the torque command value T of FIG. 1 to the servo amplifiers 3, and receive speed feedback signals from the pulse coders attached to the servomotors M1 to M4 for the various axes, so as to perform servo control. The servo-control will be described later with reference to FIGS. 6 to 8. The interface 18 is provided for the transfer of signals between the control section 10 and an object 4 of operation. The input/output circuit 16 is provided for the transfer of signals between the actuators and various sensors attached to the robot body 2.

Further, the numerical control unit 1 is arranged to be capable of changing set values of speed commands for the various axes of the robot by multiplying the set values by an override value, and also multiplying the resulting products by a coefficient, as required. To attain this, the nonvolatile RAM 12 is provided with n number of coefficient tables D1 to Dn (in this embodiment, the number n of robot axes m (where m=4), m number of coefficient tables D1 to Dm are provided) for setting the coefficient by which the override value of the speed command for each axis of the robot is to be multiplied.

In the coefficient table Dn, as shown in FIG. 5, coefficients dn are set in accordance with a torque command value Tn supplied from the NC unit 1 to the servo amplifiers 3 for the nth axis and the magnitude of a differential $dTn/dt$ of the torque command value Tn. In FIG. 5, symbols TAn and TBn designate first and second reference torque values, respectively, for the nth axis. Symbol Tnmax designates the maximum allowable output torque value for the nth axis set in a torque limiter 104 shown in FIG. 1. The first and second reference torque values TAn and TBn are set to, for example, "0.5" and "0.8", respectively. The value of a coefficient k, which is experimentally determined by the value Tnmax and the period of torque control processing (mentioned later) is set to "0.02", for example.

More specifically, if the relationships $TAn < Tn < TBn$ and $0 < dTn/dt < k \cdot Tnmax$ exists, the coefficient dn by which the override value for the nth axis is to be multiplied is set to "0.8". If the relationships $TAn < Tn < TBn$ and $dTn/dt > k \cdot Tnmax$ (increment of the torque command value during one period is substantial), exist the coefficient dn is set to "0.5". If the relationship $TBn < Tn$ (torque command value Tn is more approximate to the maximum torque Tnmax) and $0 < dTn/dt < k \cdot Tnmax$ exist, the coefficient dn is set to "0.5". If the relationship $TBn < Tn$ and $dTn/dt > k \cdot Tnmax$ exists, the coefficient dn is set to "0.3".

In the following, an operation of the robot constructed in the above manner will be explained.

Figure 4:
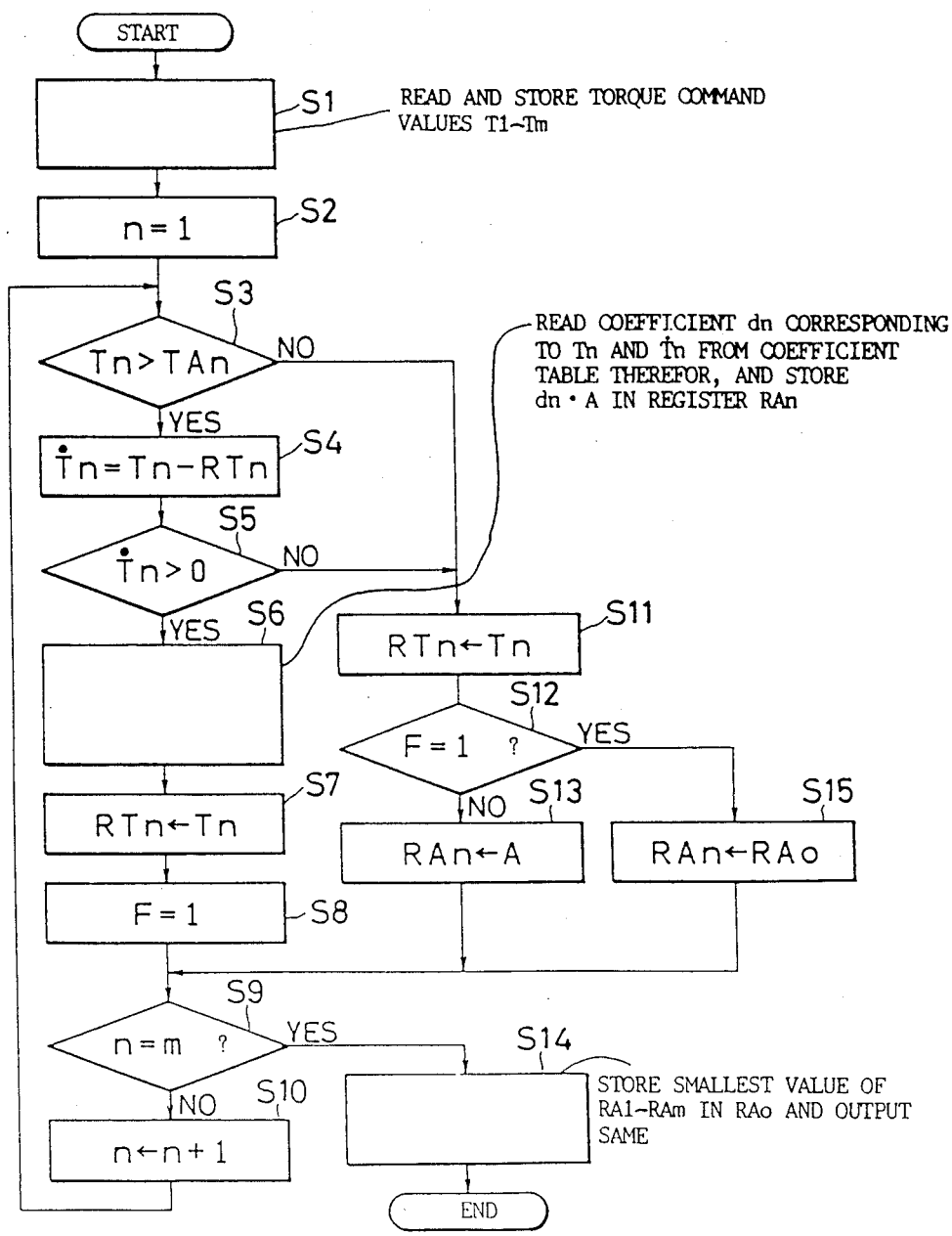
FIG. 4 is a flow chart showing a control program to be executed by the numerical control unit of FIG. 3.

When the robot is operated after it is instructed with an operation program therefor through the instruction control panel 13 or the tape reader 15, the NC unit 1 controls the robot in accordance with a move command, the speed command, and the set override value, respectively set in an instruction program. The NC unit also executes the torque control process shown in FIG. 4 at intervals having a predetermined period.

First, the CPU in the control section 10 reads torque command values T1 to Tm (the number of axes is m) delivered to the servo amplifiers 3, and causes the RAM 12 to store the values (step S1). Then, an index n is set to "1" (step S2), and a determination is made as to whether the torque command value Tn (where Tn=T1) for the axis (first axis in this case) is greater than the value TAn (where TAn=TA-1) set for the nth (first) axis (step S3). If the value Tn is not greater than the value TAn, the program proceeds to step S11, whereupon the read torque command value Tn (where Tn=T1) is stored in a register RTn (where RTn=RT1) for storing the command torque value for the nth (first) axis whether a flag F is raised is then determined (step S12). If the flag F is not raised, the set override value A is stored in a register RAn (where RAn=RA1) for storing the override value for the nth (first) axis (step S13), and whether the number m of axes is attained by the index n is determined (step S9). If the value m is not attained by the index n, the index is incremented by "1" (step S10), the torque command value Tn (where Tn=T2) for the next nth (second) axis is read out, and whether T2>TA2 holds is determined as aforesaid. If T2 is not greater than TA2, the process of S11 and the subsequent processes are executed in the aforesaid manner.

If the individual torque command values T1 to Tm are not greater than the values TA1 to TAm, respectively, the processes of steps S3, S11 to S13, S9, and S10 are executed for every axis. When the value of the index n attains the axis number m (step S9), the respective values of override registers RA1 to RAm for the individual axes, stored in step S13, are compared to one another, the smallest one of these values is stored in an override register RAo, and the stored override value is output so that the product of the override value and the speed command is output as a speed command. Thus, if the individual values of the torque commands T1 to Tm are not greater than their corresponding values TA1 to TAn, the set override value A is delivered as an override value in step S14, since the set override value A is set individually in the override registers RA1 to RAm for the various axes in step S13. If the individual torque command values T1 to Tm are not greater than their corresponding values TA1 to TAm in each program execution period, as shown in FIG. 6, the set override value A is output in step S14, as mentioned before.

Consequently the robot operates in accordance with the commands of the instruction program.

Meanwhile, if the read torque command value Tn is greater than the set value TAn of the axis concerned (step S3), the torque command value Tn for the axis concerned in the preceding period, stored in the register RTn, is subtracted from the read torque command value Tn, whereby the variation rate dTn/dt (this variation rate dTn/dt is indicative of the aforesaid differential) for each period is obtained (step S4). If the variation rate dTn/dt is positive (indicating an increase in torque), the coefficient dn corresponding to the variation rate dTn/dt and the torque command value Tn is read out from the coefficient table Dn for the nth axis set in the RAM 12. The set override value A is multiplied by the coefficient dn, and the product dn·A is stored in the override register RAn for the nth axis (step S6). Then, the read torque command value Tn is stored in the command torque storage register RTn for the nth axis (step S7), and the flag F is set to "1" (step S8). Thereafter, when the torque command value Tn is greater than the set value TAn of the nth axis, the processes of steps S3 to S8 are executed in the same manner as aforesaid. The product of the set override value A and the coefficient dn read from the coefficient table Dn is stored in the override storage register RAn for the nth axis (coefficients dn of 0.8 A, 0.5 A, and 0.3 A are individually set in accordance with the torque command value Tn and the value of the variation rate dTn/dt, using the coefficient table Dn of FIG. 5, for example).

Thus, if the relationships Tn>TAn and dTn/dt>0 exist for any one of the axes, and if the flag F is set to "1", the program proceeds from step S3 or step S5 to step S11 when the relationship Tn≦TAn or when dTn/dt>0 does not hold although the relationship Tn>TAn exists, for the other axes. In this case, after the read torque command value Tn is stored in the command torque storage register RTn for the axis concerned in step S11, it is concluded that the flag F is "1" (step S12), and the program proceeds to step S15. Thereupon, an override value Ao in the override register RAo, output in the preceding period, is stored in the override register RAn for the axis concerned.

Thus, if the value of the index n becomes equal to the value of the axis number m after step S3 and the subsequent steps are finished with respect to all the axes 1 to m in the period concerned, the values of the override registers RAn for the individual axes are read smallest one of these values is stored in the override register RAo, and this minimum override value is output.

As a result, when the torque command value Tn greater than the value of TAn set for any one of the axes is read, the override value is made smaller, so that the command speed is reduced. That is, a command move amount P per unit time distributed to each axis is reduced. Consequently, a deviation Er and the torque command value Tn are reduced.

If the torque command value Tn for one axis exceeds the set value TAn therefor, as shown in FIG. 7, the override value is made smaller, the command move amount P per unit time is reduced, and the deviation Er and the torque command value Tn are also reduced, so that the increasing rate of the torque command value Tn is lowered. However, if the load is great, the deviation Er increases, and if the torque command value Tn increases to exceed the set value TBn, as shown in FIG. 8, the override value kA is made smaller (0.5 A or 0.3 A in the example of FIG. 5). As a result, the deviation Er is reduced, and the torque command value Tn is reduced lest the maximum torque Tnmax be attained.

Thus, since the override value is controlled to vary the command speed for the robot so that the maximum torque Tnmax cannot be attained by the torque command value for any of drive axes, the drive axes are driven in alignment with one another. Although the speed of movement of the robot is lowered, therefore, the robot can move in accordance with instructions without deviating from an instruction track. Moreover, there is no possibility of the operation that the robot will be stopped by an increase of the deviation Er.

In the embodiment described above, the coefficient dn by which the override value A is multiplied is changed by dividing the range of torque command value Tn in two, depending on whether the torque command value Tn is greater than TAn or whether it is greater than TBn. Alternatively, however, the range of the torque command value may be divided into three or more. The coefficient dn may be precisely set by increasing the divisions based on the value of the increasing rate (differential) dTn/dt. Moreover, an operational expression to be used to obtain the coefficient dn may be experimentally obtained on the basis of the values of Tn and dTn/dt so that the coefficient dn can be obtained in accordance with this operational expression.

In the embodiment described above, the move command amount for every axis of the robot is reduced when one or more motors are subject to the overload state. Alternatively, however, the move command amount may be reduced only for those axes of the robot related to the track of movement thereof.

We claim:

1. A motor drive method for an industrial robot which includes at least one operating section, a plurality of motors for driving the at least one operating section with respect to a plurality of axes, and control means for delivering a move command to a corresponding one of the motors, said method comprising the steps of:

(a) detecting the outputting torques of a predetermined plurality of motor;

(b) comparing each of the output torques thus detected with a predetermined value, determined beforehand in accordance with the maximum output torque of each corresponding one of the predetermined plurality of motors;

(c) storing the output torque if the output torque is less than the predetermined value;

(d) increasing an index value if the number of axes has not been reached;

(e) comparing stored override values with each other when the index value and the number of axes are the same;

(f) storing the smallest override value comparison in an override register; and (g) outputting the stored override value as a speed command for individually decreasing an amount of the move command per unit time, for every one of the predetermined plurality of motors.

2. A motor drive method according to claim 1, wherein the predetermined plurality of motors include all the motors.

3. A motor drive method according to claim 1, wherein the predetermined plurality of motors are those motors, among the plurality of motors, which correspond to the axes related to the track of movement of the robot.

4. A motor drive method according to claim 1, wherein said step (g) includes determining the amount of the move command per unit time in accordance with the difference between the detected output torque in excess of the predetermined value and the maximum output torque corresponding thereto.

5. A motor drive method according to claim 1, wherein said step (g) includes decreasing the amount of the move command per unit time by decreasing an override value by which a speed command is to be multiplied.

6. A motor drive method according to claim 4, wherein said step (g) includes decreasing the amount of the move command per unit time by decreasing an override value by which a speed command is to be multiplied.

7. A motor drive method according to claim 2, wherein said step (g) includes determining the amount of the move command per unit time in accordance with the difference between the detected output torque in excess of the predetermined value and the maximum output torque corresponding thereto.

8. A motor drive method according to claim 3, wherein said step (g) includes determining the amount of the move command per unit time in accordance with the difference between the detected output torque in excess of the predetermined value and the maximum output torque corresponding thereto.

9. A motor drive method according to claim 2, wherein said step (g) includes decreasing the amount of the move command per unit time by decreasing an override value by which a speed command is to be multiplied.

10. A motor drive method according to claim 3, wherein said step (g) includes decreasing the amount of the move command per unit time by decreasing an override value by which a speed command is to be multiplied.

* * * * *